US007169492B2

(12) United States Patent
Scholta et al.

(10) Patent No.: US 7,169,492 B2
(45) Date of Patent: Jan. 30, 2007

(54) METHOD FOR REGULATING OPERATION OF FUEL CELL INSTALLATIONS CONTROLLED ACCORDING TO HEAT AND/OR POWER REQUIREMENT

(75) Inventors: Joachim Scholta, Nersingen (DE); Ludwig Jörissen, Neu-Ulm (DE)

(73) Assignee: Viessmann Werke GmbH & Co., Allendorf (DE)

( * ) Notice: Subject to any disclaimer, the term of this patent is extended or adjusted under 35 U.S.C. 154(b) by 524 days.

(21) Appl. No.: 10/312,796

(22) PCT Filed: Jun. 28, 2001

(86) PCT No.: PCT/EP01/07373

§ 371 (c)(1),
(2), (4) Date: Aug. 26, 2003

(87) PCT Pub. No.: WO02/01657

PCT Pub. Date: Jan. 3, 2002

(65) Prior Publication Data

US 2004/0038092 A1     Feb. 26, 2004

(30) Foreign Application Priority Data

Jun. 30, 2000    (DE) .............................. 100 31 864

(51) Int. Cl.
H01M 8/18    (2006.01)
(52) U.S. Cl. .......................... 429/20; 429/12; 429/13; 429/17; 429/21; 429/22; 429/23; 429/24; 429/26
(58) Field of Classification Search ................ 429/20, 429/21, 22, 23, 24, 26, 12, 13, 17
See application file for complete search history.

(56) References Cited

U.S. PATENT DOCUMENTS 3,585,078 A    6/1971    Sederquist et al.

(Continued)

FOREIGN PATENT DOCUMENTS

DE    1 949 184    5/1970

(Continued)

OTHER PUBLICATIONS

"Blockheizkraftwerk mit Brennstoffzellen", H. Knappstein, *Gas, Waerme international*, 1994, vol. 43, No. 4, p. 139-145.

*Primary Examiner*—Bruce F. Bell
(74) *Attorney, Agent, or Firm*—The Webb Law Firm

(57) ABSTRACT

Fuel cells are very well suited for the cogeneration of power and heat. An adaptation of the fuel cell power to the thermal requirement of the live load results in faulty adaptations and efficiency losses if the thermal requirement fluctuates significantly.

The invention aims to achieve a continuous and lossless adaptation of the thermal production of the fuel cell to the current thermal requirement.

The invention utilizes the fact that fuel cells are continuously adjustable over a broad load range. The invention proposes a continuous control of the current based on the supply or return temperature of the thermal circuit. According to the invention, a control method is used that has a quasi-continuous characteristic, particularly a control according to a PID-algorithm with additional limitation of the current as a control variable with respect to the minimum and the maximum value and of the amount of the time rate of change of the current. Such a control allows the fastest possible adaptation of the cell power to the respective thermal requirement.

12 Claims, 2 Drawing Sheets

U.S. PATENT DOCUMENTS

| | | |
|---|---|---|
| 3,745,047 A | 7/1973 | Fanciullo et al. |
| 5,023,151 A | 6/1991 | Landau et al. |
| 5,753,383 A * | 5/1998 | Cargnelli et al. ............. 429/13 |
| 6,124,050 A | 9/2000 | Stock |

FOREIGN PATENT DOCUMENTS

| | | |
|---|---|---|
| DE | 2 157722 | 7/1972 |
| DE | 43 22 765 C1 | 6/1994 |
| DE | 195 17 813 C2 | 11/1996 |
| EP | 0 377 151 A1 | 7/1990 |
| EP | 0 387 702 A2 | 9/1990 |
| EP | 1 061 599 B1 | 12/2000 |
| JP | 01-248477 | 10/1989 |
| WO | WO 98/32185 | 7/1998 |

* cited by examiner

METHOD FOR REGULATING OPERATION OF FUEL CELL INSTALLATIONS CONTROLLED ACCORDING TO HEAT AND/OR POWER REQUIREMENT

The invention relates to a method for regulating the operation of fuel cell installations according to heat and/or power requirement.

BRIEF DESCRIPTION OF THE PRIOR ART

Fuel cells, especially those with a medium or higher working temperature, are very suitable for the combined generation of power and heat in small or medium units because of their high degree of efficiency and their low pollutant and noise emission.

The fuel cell with the currently highest degree of technical development is the phosphoric acid fuel cell (PAFC), which is already commercially available. The offered unit has an electrical power of 200 kW. The cell is designed for power-controlled operating mode, but can also be used for heat separation. Depending on the system, the backward temperature may not be higher than 33° Celsius. If it is higher, an additional cooling system is activated, which discharges the excess heat into the ambient air.

Unlike combustion motors, fuel cells do not have a direct option of regulating power through the fuel supply because the gas conversion at the anode- as well as the cathode side may only be about 80 and/or 50%. Because the conversion rate in accordance with Faraday's Law is proportional to the cell current, the cell current is chosen as the control variable for fuel cells, and the gas stream is controlled according to the predetermined cell current.

If the performance of the fuel cell is supposed to be oriented not on the respective network requirement, but rather on the heat requirement of the working load, the method of adjusting the set of characteristics is chosen, according to which the heat output of the cell is determined depending on operationally relevant variables, and the appropriate power is adjusted manually according to said set of characteristics (H. Knappstein: Blockwerkheizkraft mit Brennstoffzellen [Combined Heating and Power Plants with Fuel Cells], GASWÄRME [GAS HEAT] International, 43 (1994), pages 139 to 45). Said method is used with largely stationary heat requirements or little fluctuation of the heat requirements; however, with greater fluctuation or even with a change of the cell characteristics due to ageing as well as with changes in the quality of the natural gas, it leads to mismatching. As a result of said mismatching, it is possible that either not enough heat is available, or excess heat has to be discharged through the additional cooler, which then leads to a reduction in the overall efficiency.

A regulation in the form of switching boilers on and off in stages, as it is practiced in combined heating and power plants according to their state of the art, cannot be applied with fuel cells because the frequent turning on- and off would lead to a deterioration of the fuel cell and is not economical due to the startup losses that are experienced.

Patent literature (DE 21 57 722 A and DE 19 49 184 A) describes a regulating method for regulating the fuel supply of fuel cells according to a control signal. However, this does not include a method for generating the control signal in view of a heat-controlled operation of the fuel cell.

EP 03 87 702 A2 comprises a method for regulating the forward- and/or backward temperature of a warm water heating plant. The object of said method is the performance-dependent application of a two-point- or continuous regulation method to regulate a warm water heating plant and, unlike the present invention, includes the alternating use of two-point and continuous regulation at a gas fired heating boiler on a case-by-case basis. No statements are made regarding the operation of fuel cells and in particular, no information is provided on the cell current as an effective control variable for the heat-controlled operation of a plant of this type.

EP 03 77 151 A1 comprises a method for regulating high temperature fuel cells, which regulates the cell temperature through the pre-combustion and after-combustion of gas streams and, unlike the present invention, it is not primarily intended to regulate the heat production.

U.S. Pat. No. 5,023,151 A comprises the regulation of the cooling circuit of fuel cells with the goal of a constant, cell-side coolant inlet temperature by means of a controllable bypass for a heat exchanger located in the coolant circuit. This does not control the heat output of the fuel cell itself, and thus no method for the performance of a heat-controlled operation is disclosed.

DE 43 22 765 C1 as well as WO 98/32185 describe a method for the regulation of the electrical power of fuel cells by regulating the mass stream of oxidation means. This method is not suitable for the combined heating and cooling plant operation of fuel cells because the rate of electrical efficiency of the system in the partial load operation would deteriorate with this method.

DE 195 17 813 C2 describes a method for regulating the power generation of fuel cells in the heat-controlled operation, according to which the current of the fuel cell is regulated as a correcting variable through the forward- or backward temperature of the cooling heat circuit as a control variable with the help of a continuous or quasi-continuous method of regulation. For this purpose, the regulation of the gas streams through a second control path, which may have a time advance relative to the fuel cell current regulation, if necessary, is also described there.

SUMMARY OF THE INVENTION

In the construction of a plant suitable for providing a power- and heat supply, the goal is a relatively simple and thus also economical system setup. Compared to the state of the art provided by DE 195 17 813 C2, the present invention achieves a further simplification of the system design in conjunction with an increased controllability of the system.

The invention aims at adjusting the heat production of the heat cell continuously and in a gentle and loss-free way to the current heat requirement while taking into account a simple system design, if possible.

In addition, the invention aims at decoupling of the power- and heat generation, in as much as this is possible within the system.

The invention is based on the problem of developing a mode of operation of the fuel cell that allows said adjustment with a simple system design, if possible, and ensures a sufficient distance to the limits of process control, even at constant fluctuations of the heat- or power requirement.

The problem is solved in accordance with the invention by regulating the heat production of the fuel cell using of the forward- and backward temperature of the heat circuit. The correction variable is the anode gas stream supplied to the fuel cell, where the anode gas stream is regulated according to the required heat quantity or controlled according to a set of characteristics at a constant or varying stack current.

The invention takes advantage of the fact that fuel cells can be regulated continuously over a wide load range and can be driven within large conversion ranges.

Thus, the invention consists of the use of a continuous regulation or control of the anode gas stream at constant or varying cell- or stack current.

The heat circuit can be subdivided by a heat exchanger into a coolant circuit comprising the fuel cell unit, and into a heat gain circuit, which then comprises the heat exchanger and the heat consumer, which can also be comprised of one or a plurality of heat exchange circuits.

In accordance with the invention, the regulation of the heat quantity is achieved by controlling the anode gas stream through the gas supply unit. The current flowing through the fuel cell stack can be carried along either fully or in part. Compared to the method described in DE 195 17 813 C2, the gas stream is regulated in accordance with the invention independently or with only partially carried along cell- or stack current so that the result is an operation of the system with a variable conversion rate in the fuel cell. In accordance with the invention, several concepts are possible for carrying along the stack current:

1. Regulating the stack current and thereby varying a) the rate of conversion and b) the heat quantity, with almost complete regulation of the power generation.
2. Partially carrying along the stack current under efficiency aspects. The optimization can be achieved either a) in view of the electrical efficiency or b) in view of the total usage rate of the system.
3. Decoupling the power- and the heat generation through the separate regulation of stack- and anode gas stream. Priority can be given either to the power- or also to the heat requirement as soon as cell parameters (for example, the conversion rate on the gas side) reach the system limits. In that case, if the priority is on regulating heat, the stack current is carried along in such a way that the permissible system limits in the fuel cell stack, particularly the permissible gas conversion rate, is maintained. If the priority is on regulating power, however, the anode gas stream is carried along so as to maintain the permissible gas conversion rate in the fuel cell stack. As long as this is not the case, the gas streams and the stack current may be varied independently of one another. In both cases, the stack current represents the correction variable for the electrical power, while the gas stream represents the correction variable for the heat quantity.

The definite regulation of the anode gas stream depends on the chosen operating gas and the gas processing and/or supply unit being used. In the simplest case, only one gas stream from a supply container is regulated, and the residual anode gas of the fuel cell is either burned or returned to the inlet of the fuel cell by means of known recycling. In all other cases, the product of combustion gas generation is a $CO_2$-containing gas that leads to a lean gas after conversion in the fuel cell, which can be supplied to residual gas combustion in a flame- or catalytic burner. The heat developed in said process is supplied either to the primary (cooling) or secondary (heat gain) circuit of the system, or it is used for the partial or complete supply of the reaction heat required in the anode gas processing.

Regardless of the realized version, the output gas stream of the gas processing unit is regulated or corrected directly or indirectly with the regulating method in accordance with the invention. The regulation or control of the burner stream of the gas processing unit is performed with a generally known independent control/regulation. Inasmuch as the residual gas stream is supplied to the gas processing unit to provide reaction heat, a correspondingly lesser primary gas portion is used for the provision of reaction heat.

BRIEF DESCRIPTION OF THE DRAWINGS

An embodiment of the invention is described in greater detail in the following and illustrated in detail in FIGS. 1 and 2.

DETAILED DESCRIPTION OF THE INVENTION

Figure 1:
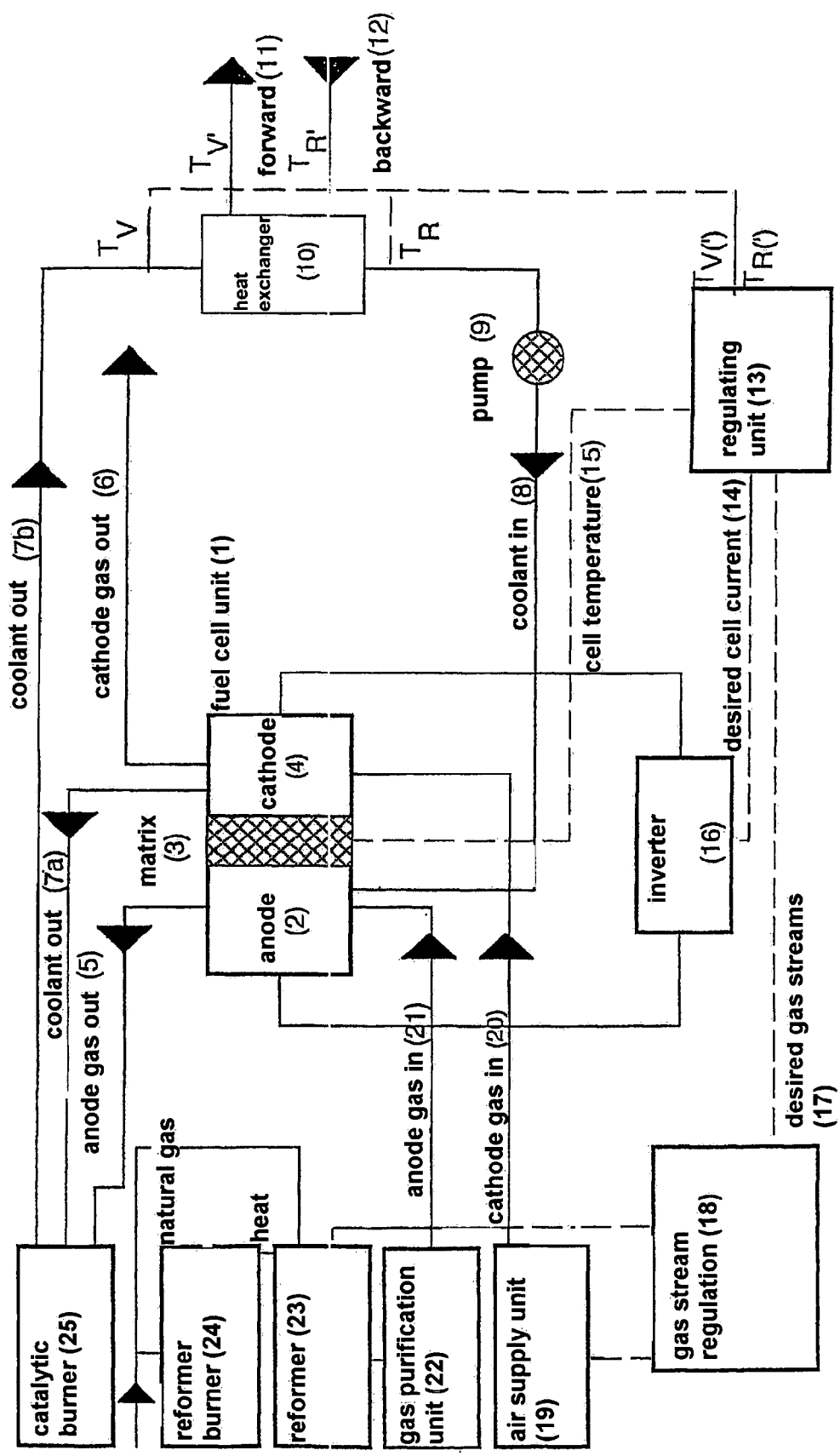
FIG. 1: Diagram of a regulating method in accordance with the invention in a fuel cell combined heating and power plant.

FIG. 1 shows the diagram of a regulating method in accordance with the invention in a fuel cell combined heating and power plant.

A fuel cell unit 1, constructed of a single cell comprised of at least one anode 2, matrix 3 and cathode 4, is supplied with operating gases by a combustion heat supply unit comprised of a reformer burner 24, reformer 23 and gas purification unit 22 on the anode side through line 21 and by an air supply unit 19 through line 20 on the cathode side. The residual gases are discharged on the gas side through an anode gas outlet 5 in a catalytic burner 25 and on the airside through a cathode gas outlet 6. The fuel cell unit 1 is cooled by a coolant circuit comprised of a pump 9, a coolant supply 8, a coolant discharge 7a and 7b as well as a heat exchanger 10. In the heat exchanger 10, the coolant is cooled by a heat gain circuit comprised of forward and backward [temperature]. The forward temperature $T_v$ of the coolant is supplied to regulating unit 13, which regulates the temperature $T_v$ through the gas stream regulation 18 by varying the anode-side gas stream and thus regulates the anode-side conversion rate to a constant value. According to the state of the art, the cathode-side gas stream is regulated depending on the cell current and the coolant temperature $T_R$. The cell current, which is adjusted by the inverter 16, is held at a constant value. The anode gas stream serves as correction variable for the produced heat quantity. Optionally, the cell current can also be varied to meet changing power requirements. In the embodiment, the plant is operated in this way according to heat as well as power requirements. There are only limits of decoupling if, for example, a maximum anode conversion rate has been set when there is a high power requirement and the produced heat quantity is nevertheless still above the value required to maintain $T_v$. In this case, the embodiment switches to priority of the heat quantity regulation and the cell current is reduced until the heat production has been adapted to the requirement at a maximum conversion rate. The output signals of the anode gas stream regulation are used for triggering gas flow regulators (not shown) that, together with a gas supply, form the gas supply unit. To regulate the anode gas stream, the regulating unit 13 is designed as a memory-programmable control (SPS) according to the PID-method in connection with a limit of the anode gas stream according to a minimum- and maximum value. The proper selection of the time constants leads to a practically non-overshooting regulation of the forward temperature $T_v$, after a step change of the heat reduction in the heat gain circuit. Time constants of 5 to 10 minutes are reached for regulating the forward temperature to the constancy of the desired value.

Figure 2:
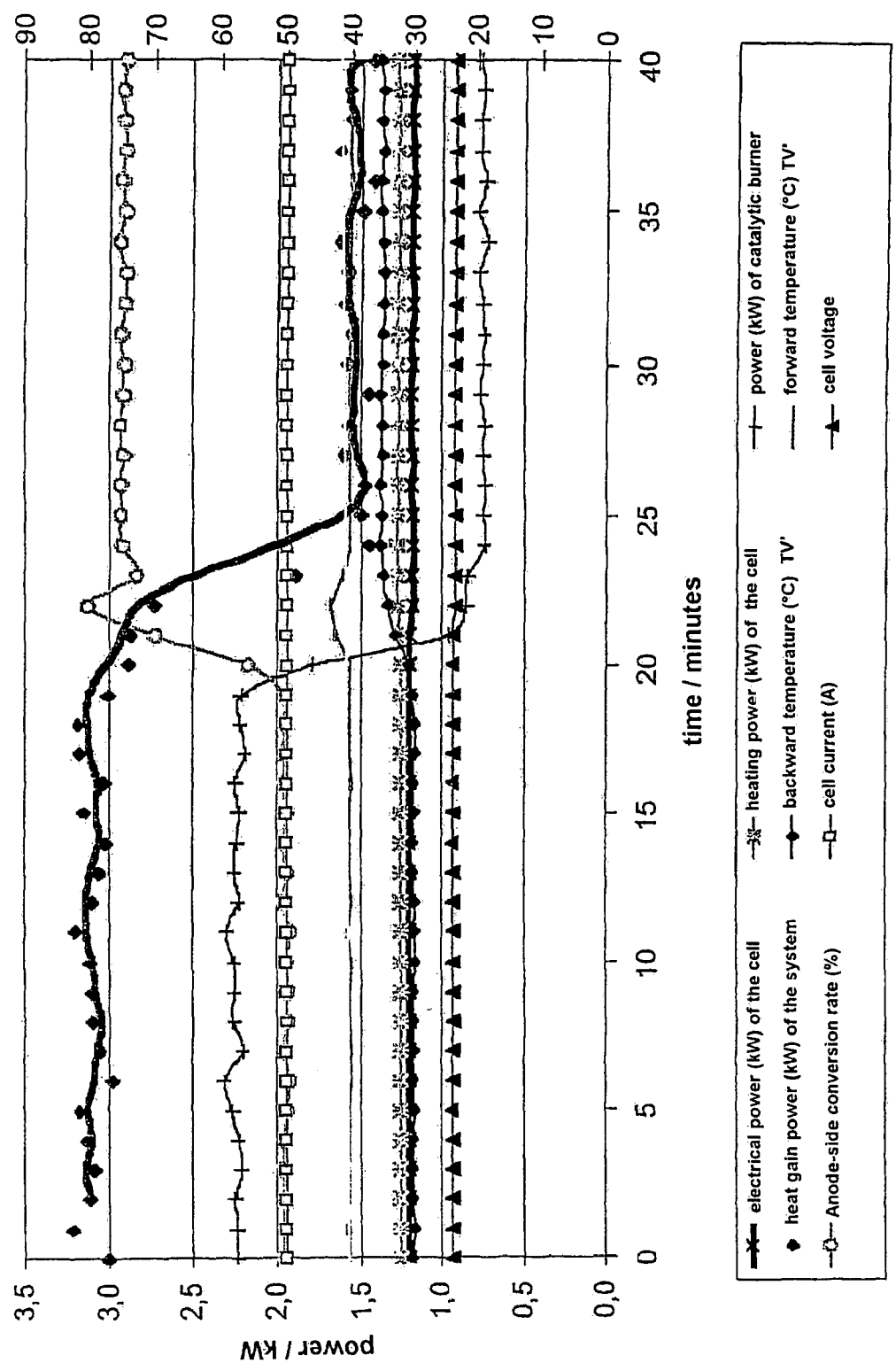
FIG. 2: Time curve of the actual values for the electrical power and for the heat stream (left y-axis) as well as the cell current, the cell voltage, the anode-side conversion rate and the forward- and backward temperature (right y-axis) during the regulation to constant forward temperature $T_v$ in the heat gain circuit.

FIG. 2 shows the time dependency of the heat- and power production with a regulating method in accordance with the invention. It was shown that, with a heat gain reduction specified by raising the backward temperature on the heat gain side, the forward temperature on the heat gain side can be regulated in accordance with the invention at a constant level by means of regulating the anode-side gas conversion. In this way, the power production remains almost constant.

In accordance with the invention, it is thus possible to achieve a regulation to constant forward temperature at changing heat reduction, as well as, to a great extent, a decoupling of power- and heat production.

The invention claimed is:

1. A method for regulating the heat production of fuel cells and a heat circuit in an operating mode that is controlled according to heat or power requirements and includes a constant or varying cell- or stack current, comprising the step of regulating the anode gas stream of the fuel cell as a correcting variable based upon the forward or backward temperature of the heat circuit.

2. The method in accordance with claim 1, wherein the cell- or stack current is carried along by regulation.

3. The method in accordance with claim 1, wherein the cell- or stack current is partially carried along, with optimization being achieved in view of the electrical efficiency or the overall efficiency of the system.

4. The method in accordance with claim 1, comprising the step of decoupling the power- and heat generation by separate regulation of cell- or stack- and anode gas stream.

5. The method in accordance with claim 1, wherein the heat circuit is formed by a direct circulation that includes the fuel cell unit and heat exchanger.

6. The method in accordance with claim 1, wherein the heat circuit is formed by a coolant circuit, a heat exchanger and catalytic converter.

7. The method in accordance with claim 6, wherein the heat gain circuit is formed of one or a plurality of heat exchange circuits.

8. The method in accordance with claim 1, wherein the forward temperature of a coolant- or the heat gain circuit is regulated.

9. The method in accordance with claim 1, wherein hydrogen or a hydrogen-rich gas obtained through reformation and gas purification is used as an anode gas.

10. The method in accordance with claim 1, wherein the regulation of the anode gas stream, comprising the step of using an PLC-controlled regulation according to the PID-method in connection with a limit of the anode gas stream according to a minimum- and maximum value.

11. A method for regulating the heat production of a fuel cell system comprising a fuel cell stack, and anode supplied with anode gas supplemented with cathode gas, a cooling circuit comprising passages through the stack and a pump for circulating coolant through the stack and a heat exchanger, the improvement comprising providing a catalytic converter for burning the excess anode gas from the anode and heating the coolant from the stack as it is passed to the heat exchanger and controlling the flow to the anode gas as a function of a temperature associated with the heat exchanger.

12. A method for regulating the heat production of a fuel cell system comprising a fuel cell stack, an anode circuit supplied with hydrogen, a cathode circuit supplied with a source of oxygen, a cooling circuit comprising passages through the stack and a pump for circulating coolant through the stack and a heat exchanger, the improvement comprising providing a catalytic converter for burning the hydrogen passed from the anode circuit and heating the coolant passed from the fuel cell stack to the heat exchanger and controlling the flow of hydrogen to the anode as a function of a temperature associated with the heat exchanger.

* * * * *

UNITED STATES PATENT AND TRADEMARK OFFICE
CERTIFICATE OF CORRECTION

| | | |
|---|---|---|
| PATENT NO. | : 7,169,492 B2 | Page 1 of 1 |
| APPLICATION NO. | : 10/312796 | |
| DATED | : January 30, 2007 | |
| INVENTOR(S) | : Scholta et al. | |

It is certified that error appears in the above-identified patent and that said Letters Patent is hereby corrected as shown below:

On The Title Page, Item (86), PCT § 371 (c)(1), (2), (4) Date,
"Aug. 26, 2003" should read -- Aug. 25, 2003 --

On The Title Page, See Item (57)      ABSTRACT

Delete the ABSTRACT as printed and insert the following ABSTRACT:

-- A method for regulating the heat production of fuel cells in an operating mode which is controlled according to heat and/or power requirements. The invention is characterized in that with a constant or varying cell current, the anode gas stream of the fuel cell is regulated as a correcting variable through the forward or backward temperature of the heat circuit as a controlling variable, or controlled according to a set of characteristics. According to the invention, this enables adjustment to a constant forward temperature with changing heat reduction, as well as extensive separation of heat and electricity production. --

Signed and Sealed this

Twelfth Day of June, 2007

JON W. DUDAS
*Director of the United States Patent and Trademark Office*